United States Patent
Tiwari et al.

(10) Patent No.: US 8,494,711 B2
(45) Date of Patent: Jul. 23, 2013

(54) AUTOMATED START-STOP SYSTEMS AND METHODS FOR INTERNAL COMBUSTION ENGINES

(75) Inventors: Awadesh Tiwari, Bangalore (IN); Vijay Shettigar, Bangalore (IN); Amit Kumar, Bangalore (IN); Srinivas B. Chande, Bangalore (IN)

(73) Assignee: GM Global Technology Operations LLC

( * ) Notice: Subject to any disclaimer, the term of this patent is extended or adjusted under 35 U.S.C. 154(b) by 490 days.

(21) Appl. No.: 12/651,514

(22) Filed: Jan. 4, 2010

(65) Prior Publication Data

US 2011/0166745 A1    Jul. 7, 2011

(51) Int. Cl.
| | |
|---|---|
| *B60L 3/00* | (2006.01) |
| *G01M 17/00* | (2006.01) |
| *F02M 1/16* | (2006.01) |
| *F02N 11/08* | (2006.01) |
| *F02B 17/00* | (2006.01) |
| *F02B 5/00* | (2006.01) |
| *B60W 10/00* | (2006.01) |

(52) U.S. Cl.
USPC .......... 701/34.4; 701/21; 701/34.1; 701/34.2; 701/34.3; 123/179.1; 123/179.2; 123/179.3; 123/179.4; 123/295; 123/305; 123/430; 123/491; 477/5; 477/6; 477/83; 477/84; 477/85; 477/86; 477/166; 477/167; 477/174; 477/181

(58) Field of Classification Search
USPC ................ 701/21, 34; 123/179.1–179.4, 295, 123/305, 430, 491; 477/5, 6, 83–86, 166, 477/167, 174, 181
See application file for complete search history.

(56) References Cited

U.S. PATENT DOCUMENTS

| | | | |
|---|---|---|---|
| 6,340,016 B1 * | 1/2002 | Ueda et al. | 123/305 |
| 6,411,880 B1 * | 6/2002 | McKee et al. | 701/55 |
| 6,736,108 B2 * | 5/2004 | Rayl et al. | 123/406.23 |
| 6,752,112 B1 * | 6/2004 | Ohata et al. | 123/179.4 |
| 6,966,868 B2 * | 11/2005 | Stork et al. | 477/74 |
| 2002/0035015 A1 * | 3/2002 | Eich et al. | 477/175 |
| 2009/0319145 A1 * | 12/2009 | Kulas et al. | 701/62 |
| 2011/0190979 A1 * | 8/2011 | Monti | 701/35 |

FOREIGN PATENT DOCUMENTS

CN    1047221    4/2003

* cited by examiner

*Primary Examiner* — Mary Cheung
*Assistant Examiner* — Majdi Alsomiri (57) ABSTRACT

An automated start/stop system for a vehicle comprises an auto-stop module, a diagnostic module, and an auto-start module. The auto-stop module selectively initiates an auto-stop event and shuts down an engine while the vehicle is running. The diagnostic module selectively diagnoses a fault in a clutch pedal position sensor of the vehicle. The auto-start module, while the vehicle is running and the engine is shut down, selectively initiates an auto-start event after the fault has been diagnosed when current drawn by a starter motor is less than a predetermined maximum starting current.

20 Claims, 7 Drawing Sheets

AUTOMATED START-STOP SYSTEMS AND METHODS FOR INTERNAL COMBUSTION ENGINES

FIELD

The present disclosure relates to internal combustion engines and more particularly to start-stop systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

A vehicle may include an auto-start/stop system that increases the vehicle's fuel efficiency. The auto-start/stop system increases fuel efficiency by selectively shutting down the engine and disabling the provision of fuel to the engine while the vehicle is running. While the engine is shut down, the auto-stop/start system selectively starts up the engine when one or more start-up conditions are satisfied.

SUMMARY

An automated start/stop system for a vehicle comprises an auto-stop module, a diagnostic module, and an auto-start module. The auto-stop module selectively initiates an auto-stop event and shuts down an engine while the vehicle is running. The diagnostic module selectively diagnoses a fault in a clutch pedal position sensor of the vehicle. The auto-start module, while the vehicle is running and the engine is shut down, selectively initiates an auto-start event after the fault has been diagnosed when current drawn by a starter motor is less than a predetermined maximum starting current.

An automated start/stop method for a vehicle comprises: selectively initiating an auto-stop event and shutting down an engine while the vehicle is running; selectively diagnosing a fault in a clutch pedal position sensor of the vehicle; and, while the vehicle is running and the engine is shut down, selectively initiating an auto-start event after the fault has been diagnosed when current drawn by a starter motor is less than a predetermined maximum starting current.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A control module selectively starts up and shuts down an engine of a vehicle when a user inputs a vehicle startup command and a vehicle shutdown command, respectively. Other than commanded vehicle startup events and vehicle shutdown events, the control module may selectively initiate engine auto-start events and engine auto-stop events while the vehicle is running (e.g., while an ignition key is in an ON position). An engine auto-stop event may include shutting down the engine while the vehicle is running. An engine auto-stop event may include starting up the engine while the vehicle is running and the engine is shut down pursuant to an auto-stop event.

However, vehicle movement may be experienced if a gear is engaged within a transmission (i.e., the transmission is not in neutral) upon engine startup. In vehicles where the transmission is a manual transmission, vehicle movement may be experienced if the transmission is not de-coupled from the engine when an auto-start event is initiated. The control module may determine whether the transmission is de-coupled from the engine based on position of a clutch pedal generated by a clutch pedal position (CPP) sensor.

The control module may disable auto-start events when the transmission is not in neutral to, for example, prevent vehicle movement. In vehicles where the transmission is a manual transmission, the control module may disable the initiation of auto-start events when the transmission is not de-coupled from the engine.

However, some vehicles do not include a sensor (e.g., a gear sensor) that indicates whether the transmission is in neutral or the CPP sensor. Even in vehicles that include the neutral sensor or the CPP sensor though, one or more faults may be diagnosed in the included sensor. When a fault has been diagnosed in a sensor, the output of the sensor may be unreliable.

The control module of the present disclosure selectively initiates an auto-start event when one or more faults have been diagnosed in the CPP sensor or the neutral sensor. The control module also selectively initiates an auto-start event when the CPP sensor or the neutral sensor are not included in the vehicle. The control module selectively initiates an auto-start event based on other available inputs, such as driver inputs (e.g., accelerator pedal position and brake pedal position) and current drawn by a starter motor for engine startup. Selectively initiating an auto-start event based on the driver inputs and the current allows the engine to be auto-started at times when auto-start events may otherwise be disabled while ensuring that vehicle movement is not experienced.

Figure 1:
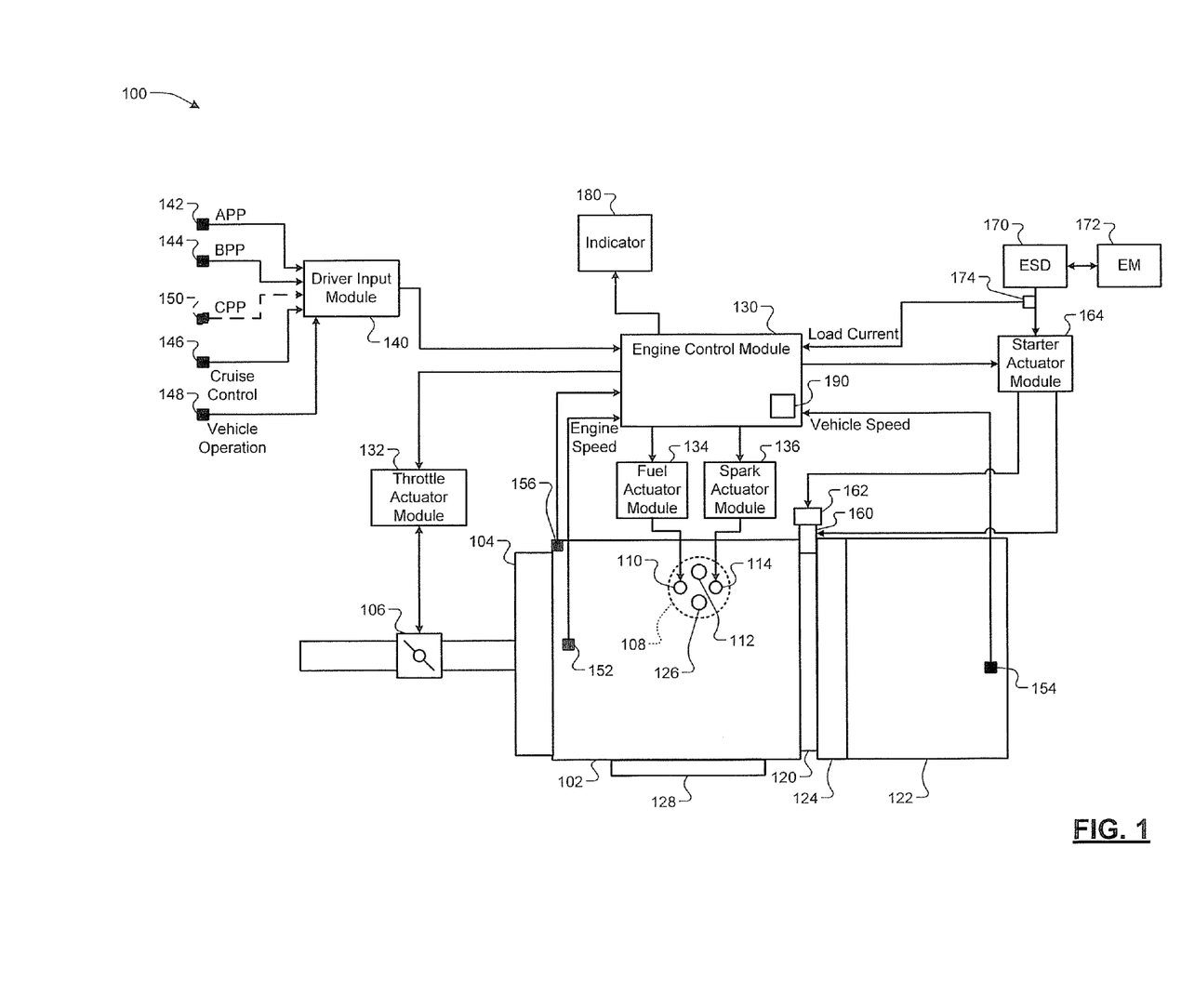
FIG. 1 is a functional block diagram of an exemplary engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle. Air is drawn into an intake manifold 104 through a throttle valve 106. The throttle valve 106 regulates air flow into the intake manifold 104. Air within the intake manifold 104 is drawn into one or more cylinders of the engine 102, such as cylinder 108.

One or more fuel injectors, such as fuel injector 110, inject fuel that mixes with air to form an air/fuel mixture. In various implementations, one fuel injector may be provided for each cylinder of the engine 102. The fuel injectors may be associated with an electronic or mechanical fuel injection system, a jet or port of a carburetor, or another fuel injection system. The fuel injectors may be controlled to provide a desired air/fuel mixture for combustion, such as a stoichiometric air/fuel mixture.

One or more intake valves, such as intake valve 112 opens to allow air into the cylinder 108. A piston (not shown) compresses the air/fuel mixture within the cylinder 108. In some engine systems, a spark plug 114 initiates combustion of the air/fuel mixture within the cylinder 108. In other engine systems, such as diesel engine systems, combustion may be initiated without the spark plug 114.

Combustion of the air/fuel mixture applies force to the piston, which rotatably drives a crankshaft (not shown). The engine 102 outputs torque via the crankshaft. A flywheel 120 is coupled to the crankshaft and rotates with the crankshaft. Torque output by the engine 102 is selectively transferred to a transmission 122 via a torque transfer device 124. More specifically, the torque transfer device 124 selectively couples the transmission 122 to the engine 102 and de-couples the transmission 122 from the engine 102.

The transmission 122 may include, for example, a manual transmission, an automatic transmission, a semi-automatic transmission, an auto-manual transmission, or another suitable type of transmission. The torque transfer device 124 may include, for example, a torque converter and/or one or more clutches.

Exhaust produced by combustion of the air/fuel mixture is expelled from the cylinder 108 via an exhaust valve 126. The exhaust is expelled from the cylinders to an exhaust system 128. The exhaust system 128 may treat the exhaust before the exhaust is expelled from the exhaust system 128. Although one intake and exhaust valve are shown and described as being associated with the cylinder 108, more than one intake and/or exhaust valve may be associated with each cylinder of the engine 102.

An engine control module (ECM) 130 controls the torque output of the engine 102. For example only, the ECM 130 may control the torque output of the engine 102 by controlling various engine actuators. The engine actuators may include, for example, a throttle actuator module 132, a fuel actuator module 134, and a spark actuator module 136. The engine system 100 may also include other engine actuators, and the ECM 130 may control the other engine actuators.

Each engine actuator controls an operating parameter based on a signal from the ECM 130. For example only, the throttle actuator module 132 may control opening of the throttle valve 106, the fuel actuator module 134 may control amount of fuel injected, and the spark actuator module 136 may control spark timing.

The ECM 130 may control the torque output of the engine based on, for example, driver inputs and inputs from various vehicle systems. The vehicle systems may include, for example, a transmission system, a hybrid control system, a stability control system, a chassis control system, and other suitable vehicle systems.

A driver input module 140 provides the driver inputs to the ECM 130. The driver inputs provided to the ECM 130 may include, for example, an accelerator pedal position (APP), a brake pedal position (BPP), cruise control inputs, and vehicle operation commands. An APP sensor 142 measures position of an accelerator pedal (not shown) and generates the APP based on the position.

A BPP sensor 144 monitors actuation of a brake pedal (not shown) and generates the BPP accordingly. A cruise control system 146 provides the cruise control inputs, such as a desired vehicle speed, based on inputs to the cruise control system 146. The vehicle operation commands may include, for example, vehicle startup commands and vehicle shutdown commands. The vehicle operation commands may be made via actuation of, for example, an ignition key, one or more buttons/switches, and/or one or more suitable vehicle operation inputs 148.

In vehicles having a manual transmission, the driver inputs provided to the ECM 130 may also include a clutch pedal position (CPP). A CPP sensor 150 monitors actuation of a clutch pedal (not shown) and generates the CPP accordingly. The clutch pedal may be actuated to couple the transmission 122 to the engine 102 and de-couple the transmission 122 from the engine 102.

In some implementations, the BPP sensor 144 and the CPP sensor 150 may measure the position of the associated pedal and generate the BPP and the CPP, respectively, based on the measured position of the associated pedal. In other implementations, the BPP sensor 144 and the CPP sensor 150 may each include one or more switches and may generate the BPP and the CPP, respectively, indicating whether the associated pedal is being actuated away from predetermined resting positions. While the APP sensor 142, the BPP sensor 144, and the CPP sensor 150 are shown and described, one or more additional APP, BPP, and/or CPP sensors may be provided.

A driver of the vehicle may apply brakes (not shown) of the vehicle by actuating the brake pedal away from its predetermined resting position. For example only, the brakes may include drum brakes, disc brakes, and/or another suitable type of vehicle brakes. The driver may de-couple the engine 102 from the transmission 122, via the torque transfer device 124, by actuating the clutch pedal away from its predetermined resting position.

The ECM 130 may selectively make control decisions for the engine system 100 based on one or more measured operating parameters. An engine speed sensor 152 measures rotational speed of the engine 102 and generates an engine speed based on the speed. For example only, the engine speed sensor 152 may generate the engine speed based on rotation of the crankshaft in revolutions per minute (rpm).

A vehicle speed sensor 154 measures speed of the vehicle and generates a vehicle speed based on the speed. For example only, the vehicle speed sensor 154 may generate the vehicle speed based on a transmission output shaft speed (TOSS), one or more wheel speeds, and/or another suitable measure of the vehicle speed. The ECM 130 may also receive operating parameters measured by other sensors 156, such as oxygen in the exhaust, engine coolant temperature, intake air temperature, mass air flowrate, oil temperature, manifold absolute pressure, and/or other suitable operating parameters.

The ECM 130 selectively shuts down the engine 102 when a vehicle shutdown command is received. For example only, the ECM 130 may disable the injection of fuel, disable the provision of spark, and perform other engine shutdown operations to shut down the engine 102. While the engine 102 is shut down pursuant to a vehicle shutdown command, when the vehicle may be said to be not running, a starter motor 160 is engaged with the engine 102 to initiate an engine startup event. For example only, the starter motor 160 may be engaged with the engine 102 when a vehicle startup command is received. The starter motor 160 may engage the flywheel 120 or other suitable component(s) that may drive rotation of the crankshaft.

A starter motor actuator 162, such as a solenoid, selectively engages the starter motor 160 with the engine 102. A starter actuator module 164 controls the starter motor actuator 162, and therefore the starter motor 160, based on signals from the ECM 130. For example only, the ECM 130 may command engagement of the starter motor 160 when the vehicle startup command is received.

The starter actuator module 164 selectively applies current to the starter motor 160 when the starter motor 160 is engaged with the engine 102. For example only, the starter actuator module 164 may include a starter relay. The application of current to the starter motor 160 drives rotation of the starter motor 160, and the engaged portion of the starter motor 160 in turn drives rotation of the crankshaft. Driving rotation of the crankshaft to start the engine 102 may be referred to as engine cranking.

Once the engine 102 is deemed running after the engine startup event, the starter motor 160 may be disengaged from the engine 102, and the flow of current to the starter motor 160 may be discontinued. The engine 102 may be deemed running, for example, when the engine speed exceeds a predetermined speed, such as a predetermined idle speed. For example only, the predetermined idle speed may be approximately 700 rpm. Engine cranking may be said to be completed when the engine 102 is deemed running.

The current provided to the starter motor 160 may be provided by, for example, an energy storage device (ESD) 170. For example only, the ESD 170 may include one or more batteries. The engine system 100 may include one or more electric motors, such as electric motor (EM) 172. A current sensor 174 measures current drawn from the ESD 170 and generates a current signal based on the current. As the current signal is generated based on the current drawn from the ESD 170, the current signal may be said to reflect electrical load or electrical load current.

The EM 172 may selectively draw electrical power to, for example, supplement the torque output of the engine 102. The EM 172 may also selectively function as a generator and selectively apply a braking torque to generate electrical power. Generated electrical power may be used to, for example, charge the ESD 170, provide electrical power to one or more other EMs (not shown), provide electrical power to other vehicle systems, and/or other suitable uses.

Other than commanded vehicle startups and vehicle shutdowns, the ECM 130 selectively initiates auto-start events and auto-stop events of the engine 102. An auto-stop event includes shutting down the engine 102 when one or more predetermined enabling criteria are satisfied when vehicle shutdown has not been commanded (e.g., while the ignition key is in an ON position). The engine 102 may be shut down and the provision of fuel to the engine 102 may be disabled, for example, to increase fuel economy (by decreasing fuel consumption). The ECM 130 may trigger illumination of an indicator 180, such as an auto-stop indicator, during auto-stop events. The indicator 180 may be implemented, for example, with an rpm gauge of a vehicle instrumentation cluster (not shown) visible within a passenger cabin of the vehicle.

While the engine 102 is shut down during an auto-stop event, the ECM 130 may selectively initiate an auto-start event. An auto-start event may include, for example, enabling the provision of fuel to the engine 102, enabling the provision of spark, engaging the starter motor 160 with the engine 102, and applying current to the starter motor 160 to start the engine 102.

Vehicle user(s) may experience vehicle movement if a gear is engaged within the transmission 122 when the auto-start event is initiated. In other words, the vehicle user(s) may experience vehicle movement when the transmission 122 is not in neutral when the auto-start event is initiated. Accordingly, the ECM 130 may disable the initiation of auto-start events when the transmission 122 is not in neutral. In vehicles having a manual transmission, the ECM 130 may disable the initiation of auto-start events when the clutch pedal is not being actuated to de-couple the transmission 122 from the engine 102.

The engine system 100, however, does not include gear sensors (e.g., a neutral sensor). Accordingly, the ECM 130 may not receive a direct indication of whether a gear is engaged within the transmission 122 or whether the transmission 122 is in neutral. In vehicles including a manual transmission, one or more faults may be diagnosed in the CPP sensor 150 under some circumstances. When a fault has been diagnosed in the CPP sensor 150, the CPP may be inaccurate. Further, some vehicles do not include the CPP sensor 150.

The ECM 130 of the present disclosure may include an auto-start/stop module 190 that selectively initiates an auto-start event even when one or more faults have been diagnosed in the CPP sensor 150, when the vehicles does not include the CPP sensor 150, and when the vehicle does not include a neutral sensor that indicates whether the transmission 122 is in neutral. The auto-start/stop module 190 selectively initiates an auto-start event based on inputs available to it. For example only, the auto-start/stop module 190 may selectively initiate an auto-start event based on one or more of the driver inputs (e.g., the APP and the BPP) and the load current. Selectively initiating an auto-start event based on the driver inputs and the load current allows initiation of auto-start events at times when auto-start events may otherwise be disabled while ensuring that vehicle movement is not experienced.

Figure 2:
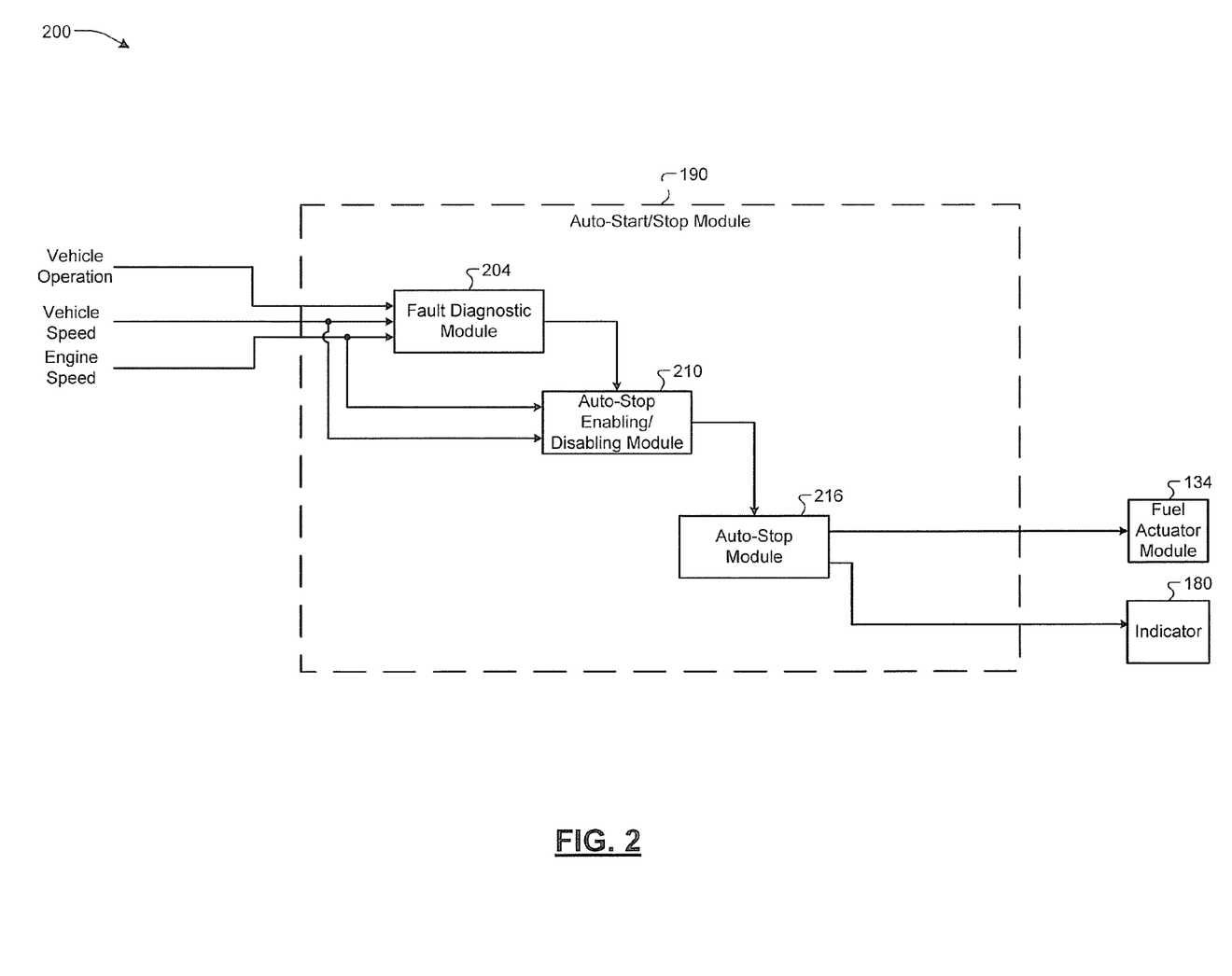
FIG. 2 is a functional block diagram of an exemplary auto-stop system according to the principles of the present disclosure.

Referring now to FIG. 2, a functional block diagram of an exemplary auto-stop system 200 is presented. The auto-start/stop module 190 may include a fault diagnostic module 204, an auto-stop enabling/disabling module 210, and an auto-stop module 216.

The auto-stop module 216 initiates an auto-stop event when triggered (i.e., enabled) by the auto-stop enabling/disabling module 210. For example only, the auto-stop module 216 may disable fuel injection via the fuel actuator module 134 when enabled. The auto-stop module 216 may also disable or adjust one or more other engine actuators. For example only the auto-stop module 216 may disable the spark actuator module 136 and allow the throttle actuator module 132 to relax the throttle valve 106 to a predetermined idle throttle opening.

The auto-stop module 216 may also trigger the illumination of the indicator 180 to notify the driver of the vehicle of the shut down condition of the engine 102 while the engine 102 is shut down during the auto-stop event. The auto-stop module 216 may maintain the shut down condition of the engine 102 and continue the auto-stop event until the auto-stop module 216 is disabled by the auto-stop enabling/disabling module 210.

The auto-stop enabling/disabling module 210 selectively enables (i.e., triggers) the auto-stop module 216 based on whether various conditions are satisfied. For example only, the auto-stop enabling/disabling module 210 may enable the auto-stop module 216 when: (1) a fault has not been diagnosed, (2) the engine speed is less than a predetermined auto-stop speed (e.g., approximately 100 rpm), and (3) the vehicle speed is less than a predetermined stopped vehicle speed (e.g., approximately 5 kph).

The auto-stop enabling/disabling module 210 may also verify that pressure is being applied to the clutch pedal to de-couple the transmission 122 from the engine 102 before enabling the auto-stop module 216. For example only, the auto-stop enabling/disabling module 210 may verify that pressure is being applied to the clutch pedal based on the CPP.

In vehicles without the CPP sensor 150 or when a fault has been diagnosed in the CPP sensor 150, the auto-stop enabling/disabling module 210 may verify that the brakes are being applied before enabling the auto-stop module 216. In such vehicles or when such a fault has been diagnosed, the auto-stop enabling/disabling module 210 may additionally or alternatively verify that pressure is not being applied to the accelerator pedal before enabling the auto-stop module 216. For example only, the auto-stop enabling/disabling module 210 may verify that the brakes are being applied and that pressure is not being applied to the accelerator pedal based on the BPP and the APP, respectively.

The auto-stop enabling/disabling module 210 may also verify that one or more of the above enabling conditions are satisfied for a predetermined period before enabling the auto-stop module 216. For example only, the auto-stop enabling/disabling module 210 may enable the auto-stop module 216 when, for the predetermined period, the engine speed has been less than the predetermined auto-stop speed and the vehicle speed has been less than the predetermined stopped vehicle speed. For example only, the predetermined period may include or be approximately 10 seconds.

Written another way, the auto-stop enabling/disabling module 210 disables the auto-stop module 216 based on whether various conditions are not satisfied. For example only, the auto-stop enabling/disabling module 210 may disable the auto-stop module 216 when: (1) one or more faults have been diagnosed, (2) the engine speed is greater than the predetermined auto-stop speed, and (3) the vehicle speed is greater than the predetermined stopped vehicle speed. The auto-stop enabling/disabling module 210 may also disable the auto-stop module 216 when pressure is not being applied to the clutch pedal (i.e., the engine 102 and the transmission 122 are coupled for torque transfer), when the brakes are not being applied, and/or when pressure is being applied to the accelerator pedal.

The fault diagnostic module 204 selectively diagnoses the occurrence of one or more faults. For example only, the fault diagnostic module 204 may selectively diagnose occurrence of a fault in the one or more vehicle operation inputs 148, the engine speed sensor 152, the vehicle speed sensor 154, the APP sensor 142, the BPP sensor 144, and the CPP sensor 150. The fault diagnostic module 204 may also selectively diagnose one or more faults attributable to, for example, the determination of the engine speed and the determination of the vehicle speed.

The fault diagnostic module 204 notifies the auto-stop enabling/disabling module 210 when one or more faults have been diagnosed. The fault diagnostic module 204 may also notify the auto-stop enabling/disabling module 210 of the source of a fault and/or other information related to a fault. The auto-stop enabling/disabling module selectively enables and disables the auto-stop module 216 accordingly.

Figure 3A:
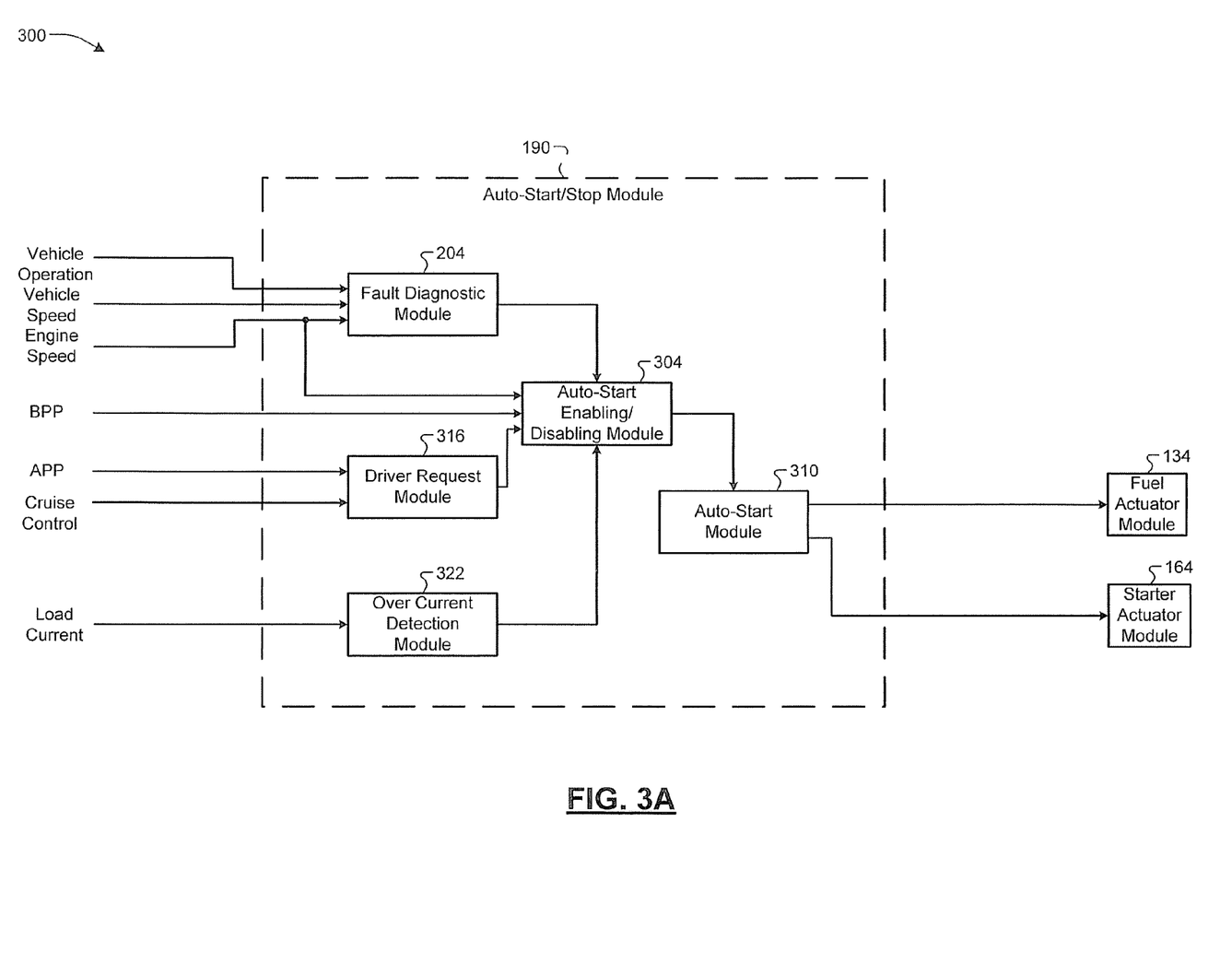
FIG. 3A-3B are functional block diagrams of exemplary auto-start systems according to the principles of the present disclosure.

Referring now to FIG. 3A, a functional block diagram of an exemplary auto-start system 300 is presented. The auto-start/stop module 190 may also include the fault diagnostic module 204, an auto-start enabling/disabling module 304, an auto-start module 310, a driver request module 316, and an over current detection module 322.

The auto-start module 310 selectively initiates an auto-start event when triggered (i.e., enabled) by the auto-start enabling/disabling module 304 while the engine 102 is shut down for an auto-stop event. For example only, the auto-start module 310 may enable (i.e., re-enable) fuel injection via the fuel actuator module 134 when enabled. The auto-start module 310 may also enable or adjust one or more other engine actuators when enabled. For example only the auto-start module 310 may enable the spark actuator module 136 and allow the throttle actuator module 132 to adjust the throttle valve 106. The auto-start module 310 may also disable the indicator 180 to disable the notification of the shut down condition of the engine 102 during the auto-stop event.

The auto-start enabling/disabling module 304 selectively enables (i.e., triggers) the auto-start module 310 based on whether various conditions are satisfied. For example only, the auto-start enabling/disabling module 304 may enable the auto-start module 310 when: (1) the fault diagnostic module 204 has not diagnosed the occurrence of a fault, (2) the engine speed is a predetermined stopped engine speed (e.g., zero), (3) the brakes are being applied, (4) the driver is not requesting torque output from the engine 102, and (5) the load current is less than or equal to a predetermined starting load current.

Written another way, the auto-start enabling/disabling module 304 may disable the auto-start module 310 when: (1) the fault diagnostic module 204 has diagnosed the occurrence of one or more faults, (2) the engine speed greater than the predetermined stopped engine speed, (3) the brakes are not being applied, (4) the driver is requesting torque output from the engine 102, and (5) the load current is greater than predetermined starting load current. Whether the brakes are being applied may be determined, for example, based on the BPP.

The driver request module 316 may indicate whether the driver is requesting torque output from the engine 102. The driver request module 316 may determine whether the driver is requesting torque output from the engine 102 based on, for example, the APP, the cruise control inputs, the opening of the throttle valve 106, and/or other suitable inputs. For example only, the driver request module 316 may determine that the driver is requesting torque output from the engine 102 when the driver has requested torque via the cruise control system 146, when pressure is being applied to the accelerator pedal, when the opening of the throttle valve 106 is greater than the predetermined idle throttle opening, and/or when the driver has requested torque output in another suitable manner. In other implementations, the driver request module 316 may determine that the driver is requesting torque output when a driver torque request is greater than a zero pedal torque. The zero pedal torque may correspond to, for example, a torque from which the driver torque request may increase as the driver actuates the accelerator pedal from its predetermined resting position (i.e., a zero pedal position).

Selectively disabling auto-start events based on the BPP and the driver's engine torque output requests ensures that an auto-start event is not initiated at when a user of the vehicle may experience vehicle movement if the auto-start event is initiated. The selective disabling of auto-start events based on the BPP and the driver's engine torque output requests may prevent such vehicle movement in vehicles without the CPP sensor 150. The selective disabling of auto-start events based on the BPP and the driver's engine torque output requests may also prevent such vehicle movement in vehicles having the CPP sensor 150 when a fault has been diagnosed in the CPP sensor 150.

The over current detection module 322 receives the load current measured by the current sensor 174 and indicates whether the load current is greater than the predetermined starting load current. The over current detection module 322 may also selectively limit the current applied to the starter motor 160 to the predetermined starting load current.

The predetermined starting load current may be calibratable and may be set based on, for example, a maximum load current necessary to drive the starter motor 160 and startup the engine 102 when the transmission 122 is in neutral or when the transmission 122 is de-coupled from the engine 102. For example only, the predetermined starting load current may be set to between approximately 200 A and approximately 400 A. Disabling auto-start events when the load current is greater than the predetermined starting load current provides an additional way of ensuring that vehicle movement is not experienced if an auto-start event is initiated.

Figure 3B:
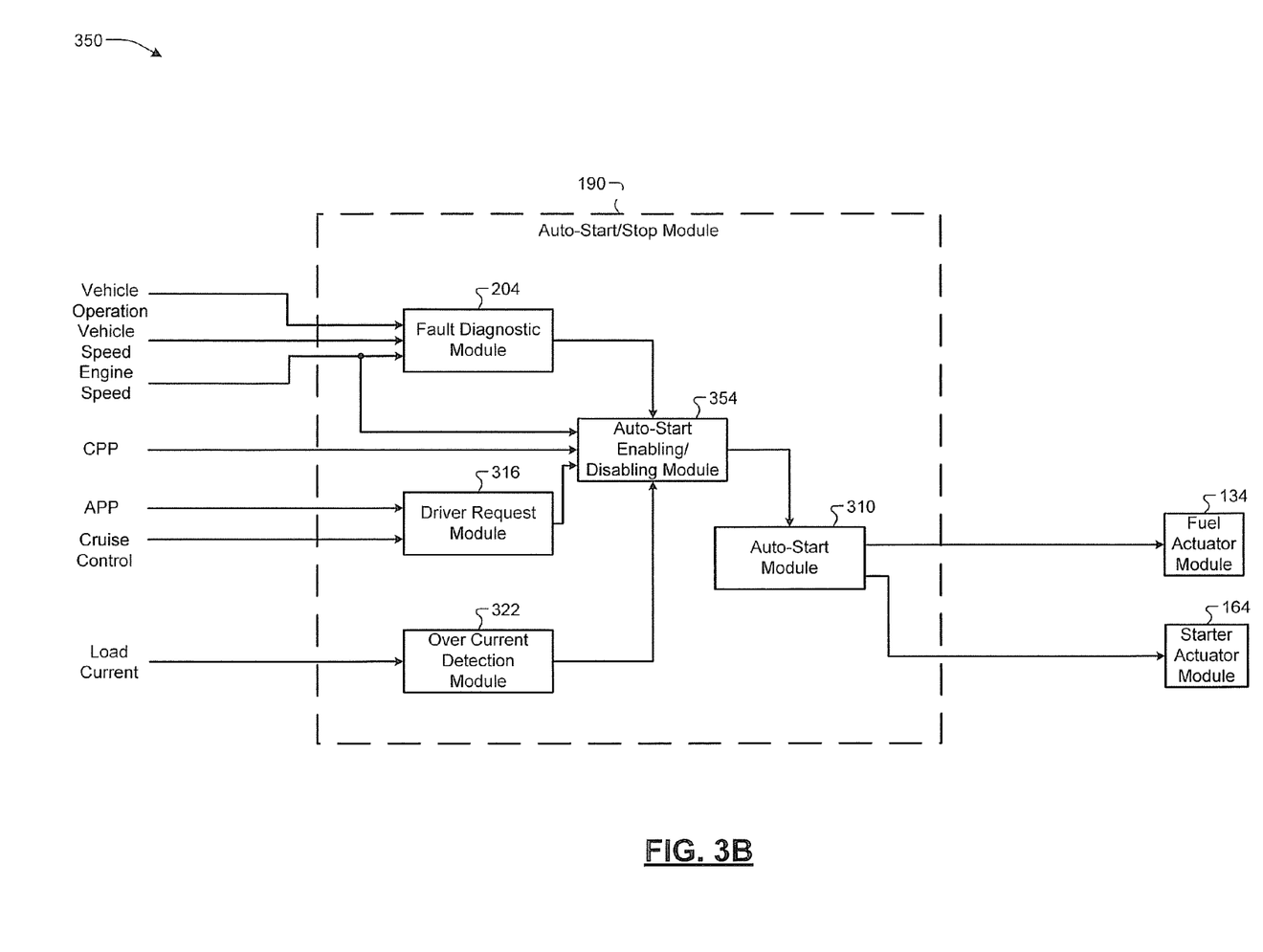

Referring now to FIG. 3B, a functional block diagram of another exemplary auto-start system 350 is presented. The auto-start/stop module 190 of the exemplary embodiment of FIG. 3B includes an auto-start enabling/disabling module 354 that receives the CPP from the CPP sensor 150. The auto-start enabling/disabling module 354 may also receive the BPP.

The auto-start enabling/disabling module 354 selectively enables (i.e., triggers) the auto-start module 310 based on the CPP. For example only, the auto-start enabling/disabling module 354 may enable the auto-start module 310 when: (1) the fault diagnostic module 204 has not diagnosed the occurrence of a fault, (2) the engine speed is the predetermined stopped engine speed, (3) pressure is being applied to the clutch pedal (to de-couple the transmission 122 from the engine 102), (4) the driver is not requesting torque output from the engine 102, and (5) the load current is less than or equal to the predetermined starting load current.

In some implementations, the auto-start enabling/disabling module 354 may additionally verify that the brakes are being applied before enabling the auto-start module 310 or may verify that the brakes are being applied when a fault has been diagnosed in the CPP sensor 150. Whether the pressure is being applied to the clutch pedal may be determined based on the CPP.

Written another way, the auto-start enabling/disabling module 354 may disable the auto-start module 310 when: (1) the fault diagnostic module 204 has diagnosed the occurrence of one or more faults, (2) the engine speed greater than the predetermined stopped engine speed, (3) pressure is not being applied to the clutch pedal, (4) the driver is requesting torque output from the engine 102, and (5) the load current is greater than the predetermined starting load current. The auto-start enabling/disabling module 354 may also disable the auto-start module 310 when the brakes are not being applied.

Figure 4:
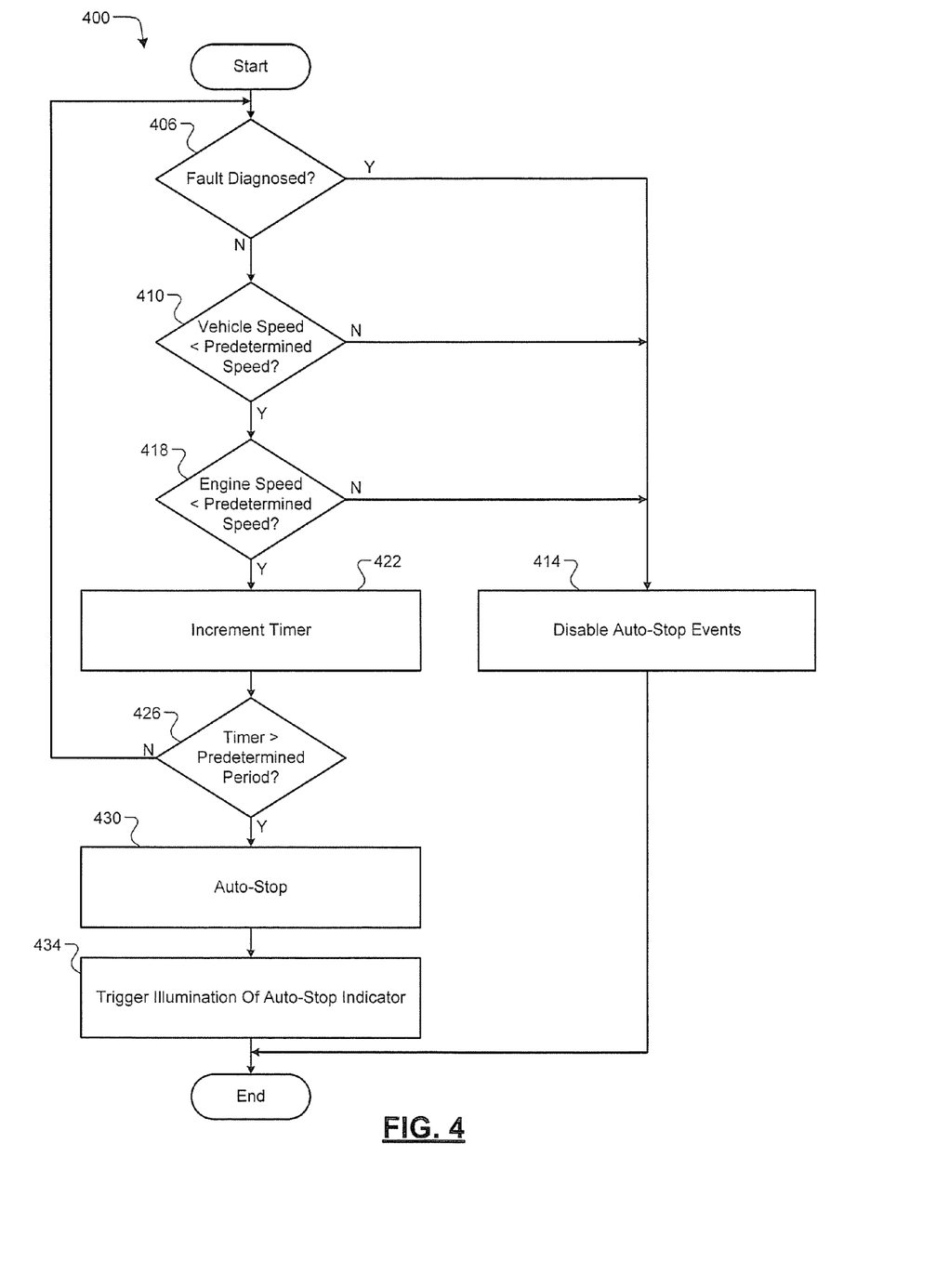
FIG. 4 is a flowchart depicting exemplary steps performed by an auto-stop method according to the principles of the present disclosure.

Referring now to FIG. 4, a flowchart depicting steps performed by an exemplary auto-stop method 400 is presented. Control may begin in step 406 when the vehicle is running and the engine 102 is running (e.g., while the ignition key is in the ON position). Control determines whether one or more faults have been diagnosed in step 406. If true, control proceeds to step 410. If false, control transfers to step 414. Control disables auto-stop events in step 414, and control may end.

In step 410, control determines whether the vehicle speed is less than the predetermined stopped vehicle speed. If true, control continues to step 418; if false, control transfers to step 414. Control determines whether the engine speed is less than the predetermined auto-stop speed in step 418. If true, control proceeds to step 422; if false, control transfers to step 414.

Control increments a timer in step 422. Control may also reset the timer to a predetermined reset value, such as zero, before incrementing the counter for a first time in step 422. In this manner, the timer tracks the period of time during which the vehicle speed has been less than the predetermined stopped vehicle speed, the engine speed has been less than the predetermined auto-stop speed, and no faults have been diagnosed. Control determines whether the timer is greater than a predetermined period in step 426. If true, control proceeds to step 430; if false, control returns to step 406. For example only, the predetermined period may be approximately 10 seconds.

In step 430, control initiates an auto-stop event of the engine 102. For example only, control may disable the provision of fuel via the fuel actuator module 134 and disable the provision of spark via the spark actuator module 136 to shut down the engine 102 in step 430. Control may also disable or adjust one or more other engine actuators to initiate the auto-stop event and shut down the engine 102 in step 430. Control triggers the illumination of the indicator 180 in step 434. Control may then end.

Figure 5A:
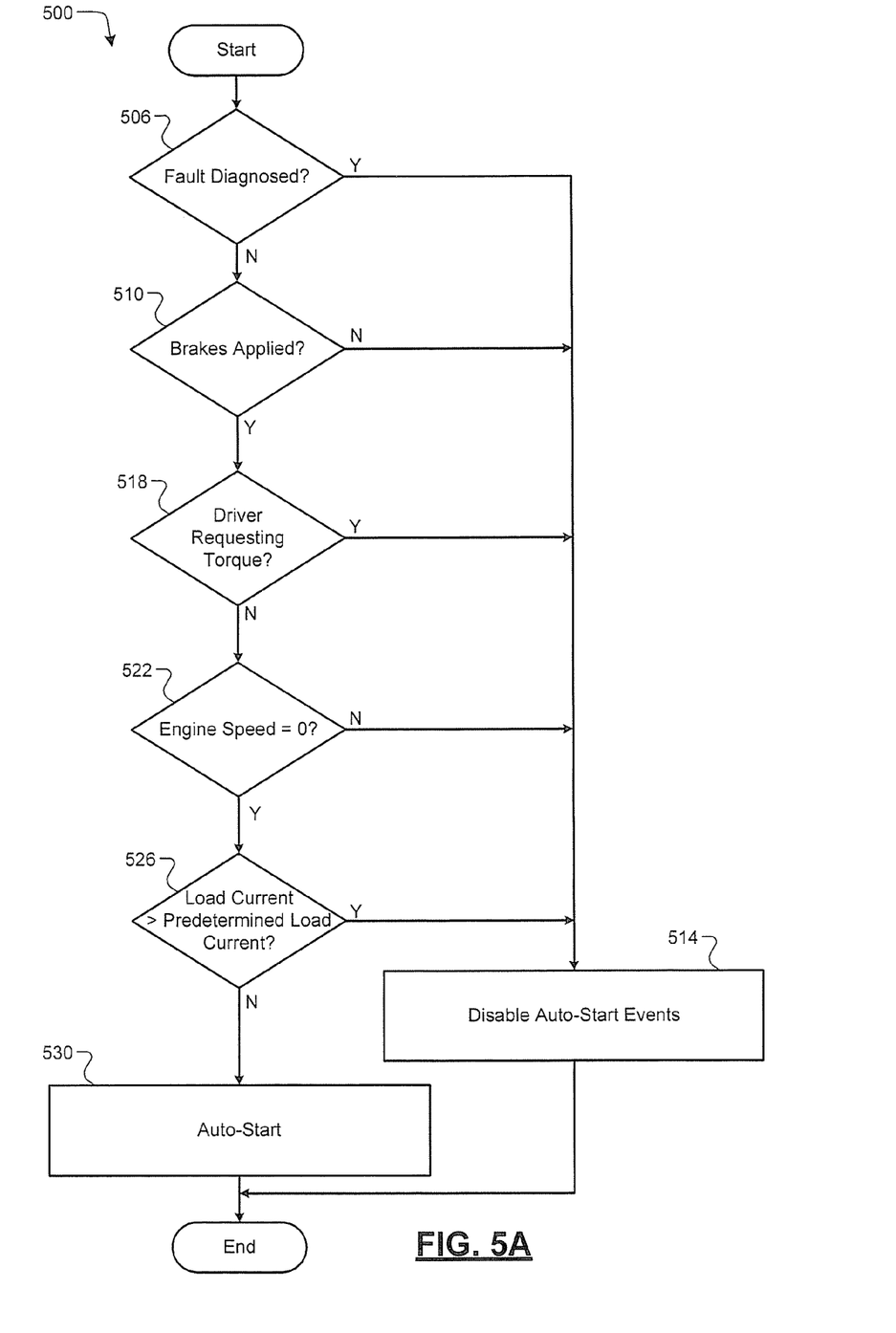
FIGS. 5A-5B are flowcharts depicting exemplary steps performed by auto-start methods according to the principles of the present disclosure.

Referring now to FIG. 5A, a flowchart depicting exemplary steps performed by an auto-start method 500 is presented. Control may begin in step 506 when the vehicle is running, but the engine 102 is shut down (e.g., while the ignition key is in the ON position). Control determines whether one or more faults have been diagnosed in step 506. If false, control proceeds to step 510. If true, control transfers to step 514. Control disables auto-start events in step 514, and control ends.

In step 510, control determines whether the brakes are being applied. If true, control continues to step 518; if false, control transfers to step 514. Control may determine whether the brakes are being applied based on, for example, the BPP. Control determines whether the driver is requesting engine torque output in step 518. If true, control transfers to step 514; if false, control continues to step 522. Control may determine whether the driver is requesting engine torque output based on, for example, the APP and the cruise control inputs.

Control determines whether the engine speed is approximately equal to the predetermined stopped engine speed (e.g., zero) in step 522. If true, control continues to step 526; if false, control transfers to step 514. Control determines whether the load current measured by the current sensor 174 is greater than the predetermined load current in step 526. If true, control transfers to step 514; if false, control initiates an auto-start event of the engine 102 and starts the engine 102 in step 530. For example only, control may enable the provision of fuel, enable the provision of spark, engage the starter motor 160, and apply current to the starter motor 160. Control may then end.

Figure 5B:
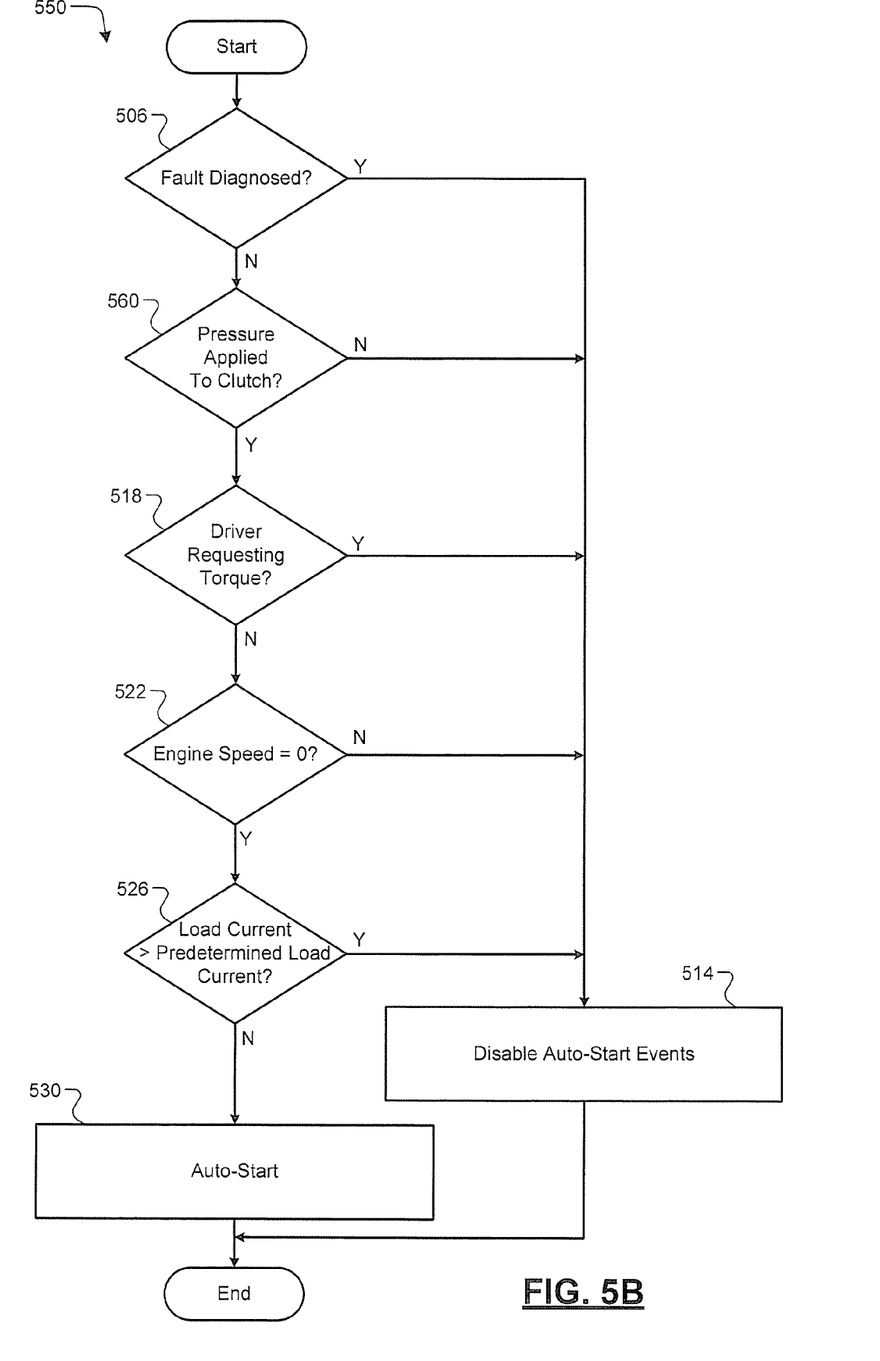

Referring now to FIG. 5B, a flowchart depicting exemplary steps performed by another auto-start method 550 is presented. Control may begin in step 506 when the vehicle is running, but the engine 102 is shut down (e.g., while the ignition key is in the ON position). Control determines whether one or more faults have been diagnosed in step 506. If true, control proceeds to step 560. If false, control transfers to step 514. Control disables auto-start events in step 514, and control ends.

In step 560, control determines whether the pressure is being applied to the clutch pedal. In other words, control determines whether the torque transfer device 124 has been actuated to de-couple the transmission 122 from the engine 102 in step 560. If true, control continues to step 518. If false, control transfers to step 514. Control may determine whether pressure is being applied to the clutch pedal based on, for example, the CPP. When a fault has been diagnosed in the CPP sensor 150 in step 506 and one or more other faults have not been diagnosed, control may instead determine whether the brakes are being applied in step 560. If the brakes are being applied, control may continue to step 518; if the brakes are not being applied, control may transfer to step 514.

Control determines whether the driver is requesting engine torque output in step 518. If true, control transfers to step 514; if false, control continues to step 522. Control may determine whether the driver is requesting engine torque output based on, for example, the APP and the cruise control inputs.

Control determines whether the engine speed is approximately equal to the predetermined stopped engine speed in step 522. If true, control continues to step 526; if false, control transfers to step 514. Control determines whether the load current measured by the current sensor 174 is greater than the predetermined starting load current in step 526. If true, control transfers to step 514; if false, control initiates an auto-start event of the engine 102 and starts the engine 102 in step 530. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An automated start/stop system for a vehicle, comprising:
   an auto-stop module that selectively initiates an auto-stop event and shuts down an engine while the vehicle is running;
   a diagnostic module that selectively diagnoses a fault in a clutch pedal position sensor of the vehicle; and
   an auto-start module that, while the vehicle is running and the engine is shut down, selectively initiates an auto-start event after the fault has been diagnosed when current drawn by a starter motor is less than a predetermined maximum starting current.

2. The automated start/stop system of claim 1 wherein the auto-start module selectively disables the initiation of the auto-start event based on an engine speed.

3. The automated start/stop system of claim 2 wherein the auto-start module selectively disables the initiation of the auto-start event until the engine speed is equal to zero.

4. The automated start/stop system of claim 1 wherein the auto-start module selectively disables the initiation of the auto-start event when the current is greater than the predetermined maximum starting current.

5. The automated start/stop system of claim 1 further comprising a driver request module that selectively determines a driver torque request based on at least one of an accelerator pedal position, a cruise control input, and an opening of a throttle valve,
   wherein the auto-start module selectively disables the initiation of the auto-start event when the driver torque request is greater than a zero pedal torque.

6. The automated start/stop system of claim 1 wherein the auto-start module selectively initiates the auto-start event further based on whether brakes of the vehicle are being applied.

7. The automated start/stop system of claim 6 wherein the auto-start module selectively disables the initiation of the auto-start event until the brakes of the vehicle are applied.

8. The automated start/stop system of claim 1 wherein the initiation of the auto-start event includes enabling of provision of fuel to the engine, engaging the starter motor with a flywheel of the engine, and applying current to the starter motor.

9. The automated start/stop system of claim 1 wherein the auto-stop module, when the engine and the vehicle are running after the fault has been diagnosed, selectively initiates the auto-stop event and shuts down the engine based on at least one of a vehicle speed and an engine speed.

10. The automated start/stop system of claim 9 wherein the auto-stop module initiates the auto-stop event and shuts down the engine when the vehicle speed is less than a predetermined stopped vehicle speed and the engine speed is less than a predetermined auto-stop speed.

11. An automated start/stop method for a vehicle, comprising:
   selectively initiating an auto-stop event and shutting down an engine while the vehicle is running;
   selectively diagnosing a fault in a clutch pedal position sensor of the vehicle; and,
   while the vehicle is running and the engine is shut down, selectively initiating an auto-start event after the fault has been diagnosed when current drawn by a starter motor is less than a predetermined maximum starting current.

12. The automated start/stop method of claim 11 further comprising selectively disabling the initiation of the auto-start event based on an engine speed.

13. The automated start/stop method of claim 12 further comprising selectively disabling the initiation of the auto-start event until the engine speed is equal to zero.

14. The automated start/stop method of claim 11 further comprising selectively disabling the initiation of the auto-start event when the current is greater than the predetermined maximum starting current.

15. The automated start/stop method of claim 11 further comprising;
   selectively determining a driver torque request based on at least one of an accelerator pedal position, a cruise control input, and an opening of a throttle valve; and
   selectively disabling the initiation of the auto-start event when the driver torque request is greater than a zero pedal torque.

16. The automated start/stop method of claim 11 further comprising selectively initiating the auto-start event further based on whether brakes of the vehicle are being applied.

17. The automated start/stop method of claim 16 further comprising selectively disabling the initiation of the auto-start event until the brakes of the vehicle are applied.

18. The automated start/stop method of claim 11 wherein the initiation of the auto-start event includes enabling of provision of fuel to the engine, engaging the starter motor with a flywheel of the engine, and applying current to the starter motor.

19. The automated start/stop method of claim 11 further comprising, when the engine and the vehicle are running after the fault has been diagnosed, selectively initiating the auto-stop event and shutting down the engine based on at least one of a vehicle speed and an engine speed.

20. The automated start/stop method of claim 19 further comprising initiating the auto-stop event and shutting down the engine when the vehicle speed is less than a predetermined stopped vehicle speed and the engine speed is less than a predetermined auto-stop speed.

* * * * *